US012379722B1

(12) United States Patent
Nehman et al.

(10) Patent No.: US 12,379,722 B1
(45) Date of Patent: Aug. 5, 2025

(54) SYSTEM AND METHODS WITH A MULTIMODAL INTERFACE FOR COMMAND AND CONTROL (INPUTS) AND MONITORING (OUTPUTS) OF UNMANNED SYSTEMS

(71) Applicant: Squire Solutions, Inc., New York, NY (US)

(72) Inventors: Kyle Jeffrey Nehman, Upper St Clair, PA (US); Dennis Alan Underwood, Jr., Oakmont, PA (US); Jeremy Brett Whitsitt, New York, NY (US)

(73) Assignee: Squire Solutions, Inc., New York, NY (US)

( * ) Notice: Subject to any disclaimer, the term of this patent is extended or adjusted under 35 U.S.C. 154(b) by 630 days.

(21) Appl. No.: 17/460,395

(22) Filed: Aug. 30, 2021

Related U.S. Application Data

(63) Continuation-in-part of application No. 17/021,403, filed on Sep. 15, 2020, now Pat. No. 11,783,820.

(Continued)

(51) Int. Cl.
| | |
|---|---|
| *G06F 3/16* | (2006.01) |
| *B64C 39/02* | (2023.01) |
| *G05D 1/00* | (2006.01) |
| *G06F 3/01* | (2006.01) |
| *G06F 3/04883* | (2022.01) |
| *G08G 5/55* | (2025.01) |
| *G08G 5/57* | (2025.01) |

(52) U.S. Cl.
CPC .......... *G05D 1/005* (2013.01); *B64C 39/024* (2013.01); *G05D 1/0016* (2013.01); *G06F 3/016* (2013.01);

(Continued)

(58) Field of Classification Search
USPC ................ 704/231, 246, 247, 251, 252, 275
See application file for complete search history.

(56) References Cited

U.S. PATENT DOCUMENTS 10,507,917 B2 * 12/2019 Taylor .................... G06V 20/13
10,569,420 B1 * 2/2020 Cohen .................... B25J 13/084
(Continued)

OTHER PUBLICATIONS

USPTO Notice of Allowance, U.S. Appl. No. 17/021,403, Dated Jul. 19, 2023.

(Continued)

*Primary Examiner* — Leonard Saint-Cyr
(74) *Attorney, Agent, or Firm* — McGeary Cukor LLC; Vincent E McGeary

(57) ABSTRACT

A system for controlling unmanned vehicles such as drones, ground vehicles and robots includes multiple human-to-machine interface components to manage interactions efficiently and effectively between humans and robots with respect to control mechanisms (i.e., inputs such as voice-commands or joystick use) and monitoring (i.e., outputs such as camera or other sensor feeds, geolocation overlay, or audio feedbacks). A system according to the principles of the invention includes numerous modalities for control (e.g., voice-control, gesture-control, touch screen, joystick or other hand-held controllers) as well as monitoring (visual screen display, heads-up-display, audio feedbacks, geolocation overlay, haptic feedback, wearable sensor devices). The system is preferably expandable and may include additional modalities in the future, such as eye-tracking as compared to voice or gesture control.

22 Claims, 5 Drawing Sheets

Related U.S. Application Data

(60) Provisional application No. 63/073,082, filed on Sep. 1, 2020, provisional application No. 62/901,259, filed on Sep. 16, 2019.

(52) U.S. Cl.
CPC ............ *G06F 3/04883* (2013.01); *G06F 3/16* (2013.01); *G08G 5/55* (2025.01); *G08G 5/57* (2025.01); *B64U 2201/20* (2023.01)

(56) References Cited

U.S. PATENT DOCUMENTS

| | | | |
|---|---|---|---|
| 2017/0235308 A1* | 8/2017 | Gordon | G05D 1/0016 701/2 |
| 2017/0355080 A1* | 12/2017 | Podnar | B25J 19/023 |
| 2020/0171667 A1* | 6/2020 | Anderson | B25J 9/1697 |
| 2020/0241575 A1* | 7/2020 | Meisenholder | G05D 1/0016 |
| 2021/0240986 A1* | 8/2021 | Gurajapu | G05D 1/0038 |

OTHER PUBLICATIONS

USPTO Final Office Action, U.S. Appl. No. 17/460,391, Dated Jun. 29, 2023.

PCT International Search Report, International Application No. PCT/US2022/049063.

PCT Written Opinion of the International Searching Authority, International Application No. PCT/US2022/049063.

USPTO Office Action, U.S. Appl. No. 17,021,403, Dated Oct. 13, 2022.

USPTO Office Action, U.S. Appl. No. 17,460,391, Dated Dec. 2, 2022.

* cited by examiner

500

SYSTEM AND METHODS WITH A MULTIMODAL INTERFACE FOR COMMAND AND CONTROL (INPUTS) AND MONITORING (OUTPUTS) OF UNMANNED SYSTEMS

CROSS-REFERENCE TO RELATED APPLICATIONS

This application claims the benefit of:
U.S. Provisional Application No. 63/073,082, entitled "System and Methods with a Multimodal Interface for Command and Control (Inputs) and Monitoring (Outputs) of Unmanned Systems," filed on Sep. 1, 2020, which is incorporated herein by reference; and
U.S. patent application Ser. No. 17/021,403, entitled "System and Method for Highly Efficient Information Flow using Natural Language Processing and Speech Recognition," filed on Sep. 15, 2020, which is incorporated herein by reference.

FIELD OF THE INVENTION

The invention relates generally to the fields of Artificial Intelligence (AI), Automation, Human-Machine Teaming (HMT), Human-Robotic Interface (HRI), Human-Computer Interaction (HCl) and Autonomous Control of Unmanned Systems (UxS), and more particularly to the use of a multi-modal user interface in the control of UxS.

BACKGROUND OF THE INVENTION

During UxS military activities, current methods for UxS control and monitoring require dated or conventional inputs for robot manipulation (e.g., joysticks, touch screens, stylus, etc.). These input modalities can prevent hands-free capabilities and reduce situational awareness (e.g., users need to sling rifles or have target fixation, focusing on a device screen, etc.). As a result, inefficiencies cause delays that could cost lives (e.g., delayed sensor coverage over a potentially hostile location, etc.). The same types of issues occur within commercial environments. For example, if a business hires security guards that employ UxS or drones, users can potentially become fixated on a device touch screen without maintaining attention on the unmanned system.

Operational environments can vary significantly, and different settings may require different capabilities with respect to the UxS and the user interface. Different interaction technology modalities have associated pros and cons. For example, with voice-control, a control system provides a hands-free solution with offline function (edge computing) for communication degraded environments, coupled with Artificial Intelligence (AI) and other select technologies (e.g., geo-location, etc.) to reduce cognitive load and increase situational awareness. As is often the case with many technologies, the related trade-offs are evaluated and addressed on a case-by-case basis. This type of analysis applies to HRI technologies, as well (i.e., a touch screen may provide a high-quality visual display versus a voice or audio-driven feedback mechanism that lacks visual ingestion but is "hands-free").

With recent advances in technology and intelligent systems, customer or end user experience has become more important and is expected to increasingly take priority in the future. This is not only the case for the various products and services that consumers purchase, but it is also true of the means by which the user or customer interactions occur, in this case for the control and monitoring of robots and UxS. There is a need, therefore, in terms of the HRI experience for consumers, for more transparent or seamless methods coupled with increased control, ease of use, security and optionality around such interactions.

U.S. patent application Ser. No. 17/021,403, entitled "System and Method for Highly Efficient Information Flow using Natural Language Processing and Speech Recognition," describes a modality involving Natural Language Processing (NLP) and Speech Recognition (powered by, or in conjunction with machine-learning and artificial intelligence capabilities and sophisticated algorithms), utilizing voice-control to automate certain command functions such as flight plans, sensor tasking, or multi-robot swarm functionality. Regarding NLP, language processing engines identify words and grammar to derive meaning from inputs (e.g., speech, text, etc.) and combines artificial intelligence with computational linguistics to process and understand the natural language received by the computer.

An industry report explains a difference between voice recognition and speech recognition. Voice recognition software uses an individual's voice for recognition purposes. Speech recognition concerns the ability of a machine to understand and carry out spoken commands by interpreting articulated words. See, Hadad, J. (2017), *IBISWorld Industry Report OD4531, Speech and Voice Recognition Software Developers in the US.* (Retrieved Mar. 19, 2018 from IBISWorld database).

Across industries, the primary interfaces of decades past such as touch are giving way to new modalities (e.g., voice-control, gesture-control, etc.). User requirements can change drastically, with significant variation depending on the environment or any myriad of other relevant factors. For example, a military operation in an urban environment will likely require a different composition of forces, equipment, and methodology of approach as compared to that of other types of operations in rural settings. As such, the respective operational requirements may be radically different.

To further illustrate this problem, certain missions might inherently require stealth, which could preclude the use of a visual display or touch screen, as it might give away a soldier's location during nighttime operations. Said differently, if a mission is being conducted in a semi or non-permissive environment, perhaps with sensitivities around early-warning networks or noise-signatures, voice-control may not be a viable option. Accordingly, having user options among multiple HCl components for UxS control and monitoring is extremely valuable.

SUMMARY OF THE INVENTION

A system according to the principles of the invention includes multiple HRI and HCl components to manage interactions efficiently and effectively between humans and robots with respect to control mechanisms (i.e., inputs such as voice-commands or joystick use) and monitoring (i.e., outputs such as camera or other sensor feeds, geolocation overlay, or audio feedbacks). A system according to the principles of the invention includes numerous modalities for control (e.g., voice-control, gesture-control, touch screen, joystick or other hand-held controllers, etc.) as well as monitoring (e.g., visual screen display, heads-up-display, audio feedbacks, geolocation overlay, haptic feedback, wearable sensor devices, etc.). The system is preferably expandable and may include additional modalities in the future, such as eye-tracking as compared to voice or gesture control.

An exemplary system provides means by which information, command prompts, and other data or feedback is exchanged between humans and unmanned vehicles (including robots) by providing a fusion point through a single platform for a multimodal interface around UxS control functions, operational tasking, and monitoring. Illustratively, a system enables users to switch back and forth between various modalities for control and monitoring of UxS, based on specific use cases, personal preference, or other conditions of the environment that may be more (or less) conducive to certain methods. In one aspect of the invention, the system implements voice recognition, particularly regarding authentication methods as a means of not only confirming but also securing other command functions, prompts, or actions such as transmitting files, or perhaps to initiate follow-on command prompts such as a drone landing on the ground or returning to a user's location. A system according to the invention can be used in various industry segments such as military, public safety and commercial markets.

A system according to the principles of the invention includes a multi-modal human-to-machine interface responsive to a plurality of human input modes. The interface in turn includes at least one of a voice input, a hand-held controller, and a touch screen input, and at least one human feedback device. It will be apparent to a person of ordinary skill in the art after having read this disclosure that the type of input modes are not limiting and that multi-modal interfaces having different combinations of inputs and feedback devices may be implemented according to the invention An illustrative system includes an authentication module responsive to the multi-modal human interface and operable to authenticate access to the system, and to authenticate other functions. A ground control station in networked communication with the multi-modal human interface is operable to process commands input via the multi-modal human interface including to translate the commands to control commands executable by the unmanned vehicle. In the illustrative system, the unmanned vehicle thereby follows control commands input via at least one of the inputs of the multi-modal human interface.

In an illustrative method for operating a UxS according to the principles of the invention, the user authenticates into a control system having a multi-modal interface preferably of the type described above. The user selects one or more of the input modalities, such as joystick or voice recognition, either before or after authentication. Control commands for the UxS are input using the selected modality. A translation step translates the input commands to equivalent commands understandable to the UxS. The translated commands are transmitted to the UxS over a communication channel. The UxS responds to the commands. In an illustrative method, the user selects a modality or modalities other than a modality natively supported for the UxS. In another illustrative method, the user selects one or more feedback modalities.

A system according to the principles of the invention translates data in real time to help users focus on task execution, while providing secure, scalable mobile device, user, group and data management capabilities, using industry standard commercial mobile-centric technologies. User and sensor data are passed securely between mobile application and server infrastructure and can rapidly scale, using governance techniques compliant with industry standards and legal requirements, such as National Institute of Standards and Testing, Health Insurance Portability and Accountability Act and Payment Card Industry Standards. Data conforms to a system data model end-to-end from mobile devices to enterprise server infrastructure, where it is displayed via a system management portal or routed to tailored dataflows or follow-on systems. In one aspect of the invention, all capabilities can deploy using commercial cloud or standalone settings with mobile, middleware and server components deployed to the end-to-end system framework.

An exemplary system data model, also called input data model, is a construct within software implementing a system according to the invention. One instance of a system data model can be the internet protocol User Datagram Protocol (UDP) where the data model resides within the datagram element of the message. Contained within this protocol may be the message type, message ID, the UxS-ID, a counter, an "acknowledge receive" or "no acknowledge received" command, the flight instructions, Ground Control Station ID, and other data elements that would be apparent to a person of ordinary skill in the art after having read this disclosure. The minimal set would be the flight instructions or operations instructions for the UxS and the message type. The system data model may also be encrypted, and contain checksums. The message type describes if the message is a voice command, UxS machine encoded instruction, a tap from a wearable, or an acknowledge message from the UxS or some other type relevant to a multi-modal interface system according to the invention. A person of ordinary skill in the art having read this disclosure will understand how to assign data elements according to a system data model to achieve multi-modal interfaces for UxS.

In an exemplary system, a system management portal acts as a message broker and message router from a UxS to a GCS or any intermediate messaging relay stations. The system management portal can reside in vehicle computer devices, network hop stations, airborne aircraft servers, command and control servers, or any place above the primary level of the base of the network, such as above the base of a star network as may be used to control UxS. The routing takes place based on the message type described above.

A system according to the invention improves information and data flows, namely surrounding command and control functions as well as monitoring by utilizing conventional inputs (e.g., touch screens, stylus, joystick or controller), gesture-control, voice-control, speech recognition and voice recognition in conjunction with other artificial intelligence and select enhancing or overlapping technologies such as geo-locational, camera, wearable, or other sensor technologies. The system promotes an unobtrusive, flexible, seamless user experience through interactions while simultaneously enhancing or increasing security in terms of encryption, data protection and user authentication as part of those interactions.

Moreover, a multi-modal interface for UxS control and monitoring provides users with options for HMT and HRI components, tailored toward user needs and requirements. The exemplary system enables UxS or drone control, navigation or setting waypoints, and basic functionality or task management such as flight plans or sensor taskings. A person of ordinary skill in the art will understand after reading this disclosure how to instantiate other tasks depending on the unmanned vehicle under control. A task includes a predetermined sequence of actions to be executed by the UxS which can be commenced with a user command input on a selected input device as configured by a user.

As mentioned, the system affords options relating to UxS and/or user data-processing or feedback ingestion. Based on user needs, the system will also facilitate threat detection (e.g. audio or haptic feedback if the robot camera sensor detects a weapon). In addition, based on user needs, the system provides other potential benefits such as decreased physical or cognitive load on the user, increased situational awareness, preservation of other hand use or dexterity (e.g., hands-free capability with voice), or improved AI or Machine Learning (ML) data analytics capabilities.

In another aspect of the invention, a configurable multi-modal interface according to the principles of the invention increases the functionality and usability of a UxS. For example, a given mission may benefit from gross movement of a drone to known coordinates, followed by a preprogrammed task such as detecting a particular asset via a sensor such as a camera, followed by fine drone movements best implemented with hand control, followed by performing a predetermined task that can be instantiated with a push button on a wearable. In a system according to the invention, a user can selectively configure the appropriate human to UxS controls even if such controls are not native to the drone system. As such, a system expands the drone's practical application in unexpected and advantageous ways limited only by a user's imagination in deploying interface modes within a given use context.

DETAILED DESCRIPTION

Figure 1:
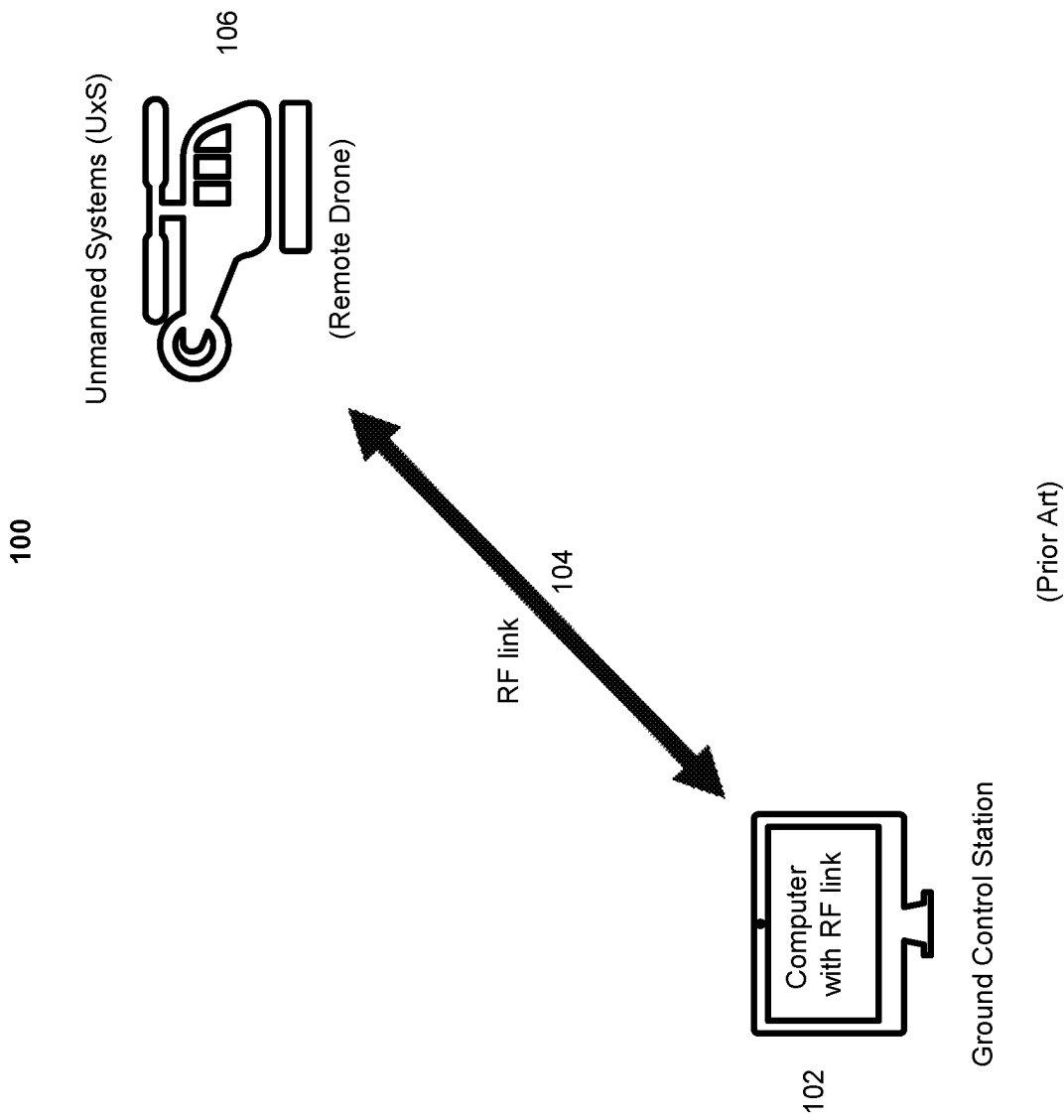
FIG. 1 shows a prior art drone control system.

HMT or UxS control and monitoring according to the principles of the invention improves the ways that information relating to UxS inputs and outputs are:

(1) Captured—such as speaking into a device, gestures (wearable sensors), using a touch screen or traditional joystick, stylus, and other modes that will be apparent to a person of ordinary skill in the art after reading this disclosure;

(2) Extracted—using voice or touch, haptic inputs or other commercial AI capabilities;

(3) Authenticated—using voice recognition for user authentication in lieu of or in addition to other authentication methodologies such as geo-locational technology, finger or thumbprints (e.g., touch screens), and facial recognition; and (4) Routed—data or digital file transfer via encrypted pathways with more secure, accurate user authentication to enable the subsequent UxS control and monitoring with encrypted connections for easier and faster interactions while preventing or mitigating any types of interception activity.

A person of ordinary skill in the art after reading this disclosure will understand how to implement a multi-modal human-to-machine interfaces for a UxS and to advantageously implement such an interface within a given environment or context. The exemplary system permits multi-modal control according to the invention through the use of a data input model and input data normalizing. In conjunction, these elements provide for mapping the data outputs of any human interface device, whether currently in use or to be developed, to an input data model that can be processed by multi-modal interface and GCS effects middleware. In turn, the normalizing process normalizes all relevant input modes whenever a user inputs on any input device such that the normalized input command can be translated to machine language executable by the UxS. The exemplary system also provides for the translation service, usually deployed on a system portal element, that can read and process the normalized input data. The translation device takes the human input data and translates the data to a form understood by the UxS. In this way, the exemplary system can deploy any input mode with any UxS irrespective of whether that input mode is supported natively by the UxS.

A person of ordinary skill in the art having read this disclosure will understand that the principles of the invention can be implemented in any UxS system so long as there is a computing process on which to deploy the services. In an exemplary system, the data input model mapping can be implemented locally on the user control terminal. The normalizing and translating service is illustratively deployed on a system management portal; however, a person of ordinary skill in the art will understand that the services can be deployed on a GCS or at other points in a networked communication between a control terminal and a UxS and that the services can be distributed.

For purposes of this disclosure, a human-to-machine interface includes the systems and components by which a human interacts with a system such that the human provides inputs to the machine and receives outputs or feedback from the machine or system. Examples for inputs include voice inputs, hand-held controllers, touch screen, gesture input devices, tactile inputs such as buttons and the like. Examples for outputs include visual display, heads-up-display, audio, haptic, geolocation overlay, wearable sensors and the like. A person of ordinary skill in the art will understand that human-to-machine interfaces continue to evolve and may be implemented with a disclosed system without departing from the invention.

For purposes of this disclosure, unmanned systems, unmanned vehicles or UxS means any type of vehicle or robotic that may be controlled with a human-to-machine interface. Examples include drones, unmanned ground vehicles, and robots. Unmanned vehicles as used in this disclosure respond to instructions or commands provided to the UxS in a machine language the UxS understands. Machine language simply refers to the data set the UxS can process with its associated logic and processing capabilities. A person of ordinary skill in the art will understand after reading this disclosure how to implement systems according to the invention for devices that respond to commands transmitted to them in a machine language.

Mode or modality refers to the particular way a human interface permits inputs and delivers outputs. For example, voice input may be referred to voice input mode and constitutes a modality. Likewise, audio feedback is an exemplary mode for providing user feedback. A person of ordinary skill in the art will understand that unmanned vehicles typically operate according to an input mode provided by the unmanned vehicle system producer. In this disclosure, such an input mode is said to be native to the unmanned vehicle. A non-native input mode, therefore, is an input mode which provides inputs to an unmanned vehicle or robot that the unmanned vehicle does not natively respond to. For example, a particular drone may not have native support to respond to a push-button or voice command, but instead may come equipped with only a joystick controller.

FIG. 1 shows a prior art drone control system 100. Essentially the system consists of a ground control station 102 in radio 104 communication with a drone 106. The GCS 102 may be in communication with a human interface device (not shown) or a human interface may reside on the GCS. 102. "Control" refers to actual operation control components that enable the UxS technologies to function, as desired or as intended. "Operation Control" components are commonly referred to as "Ground Control Stations" or "Common Control Systems."

As described in an *Unmanned Systems Technology* article, "Ground Control Stations (GCS)" are sets of ground-based hardware and software that allow UAV operators to communicate with and control a drone and its payloads, either by setting parameters for autonomous operation or by allowing direct control of the UAV." See, *Ground Control Stations for Unmanned Aerial Vehicles, Drones and Remotely Piloted Aircraft Systems*, Copyright 2019, EchoBlue Ltd. (Unmannedsystemstechnology.com). As the article explains, in many cases, there may also be a GCS specific to a particular model of drone, designed to operate with multiple models manufactured by the same company, or universal—compatible with many UAV makes, models and payloads. Some GCS may also be configured to work with other unmanned systems such as unmanned surface vehicles (USVs) and unmanned ground vehicles (UGVs). GCS involves a processing unit in conjunction with transmitters, receivers, and the actual onboard computing platform that, collectively, allow for signal communications back and forth between the robot (e.g., UAV, UUV, etc.) and the GCS. The GCS 102 essentially serves as the intermediary for appropriate translation of two-way communications between the user or operator and the actual robot. The GCS provides commands to the UxS in the machine language the UxS can understand and process.

An exemplary system according to the invention includes or accommodates for organic or native "operation control" hardware and software components that enable the UxS functionality, more broadly. In another aspect of the invention an illustrative system integrates third party "operation control" hardware and software components via the data input model a normalization and translation services. This flexibility promotes seamless interoperability across customer channels, regardless of the specific make, model, or composition of the actual robots or UxS (e.g., Unmanned Aerial Vehicles or UAV, etc.).

Figure 2:
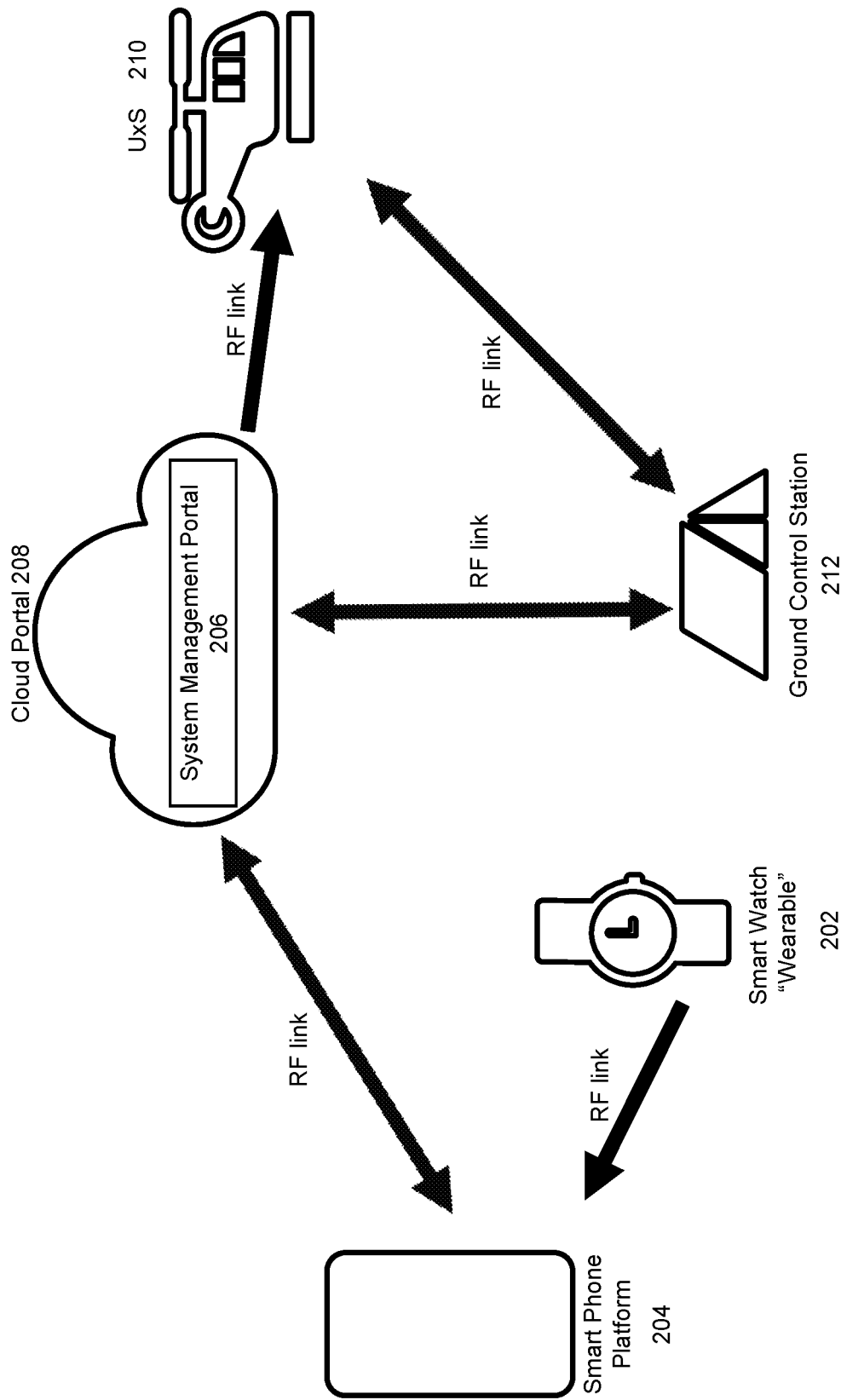
FIG. 2 shows an exemplary system according to the principles of the invention.

FIG. 2 shows an exemplary system 200 according to the principles of the invention. In the illustrated configuration of the system 200 the multi-modal inputs come from a wearable 202 and a smartphone platform 204. The wearable 202 is in radio communication with the smartphone 204, although the wearable could be in direct communication with other elements or nodes of the system 200. A system management portal 206 resides on the cloud 208. A UxS 210 communicates with the system management portal 206 on the cloud and with a GCS 212. The GCS is in radio communication with the portal 206 and the UxS 210. The elements 202, 204, 206, 210 and 212 of this exemplary system 200 can be referred to as elements or nodes. A person having ordinary skill in the art having read this disclosure will understand that the system can include additional networked elements and the number and types of illustrated user devices, UxS machines and other elements is not limited. Likewise, the invention can be deployed in different network topologies and use various communication links and protocols.

A person having ordinary skill in the art having read this disclosure will understand GCS can also have communication with the human control devices 202 and 204, that the human control devices can be a gesture device, a voice control device, a joy stick or any controller the user may desire as further discussed in this disclosure. The input devices of system 200 are merely illustrative.

The system 200 passes messages for controlling the UxS in conformance with the data input model, illustratively described in connection with FIG. 3, until the last hop when at the system management portal 206 the message is translated into the actual drone commands needed to maneuver the craft 210 in the desired manner. FIG. 2 shows a GCS 212 as a redundant element within the system to satisfy the FAA requirements and to provide another link to the UxS if the link between the multi-modal devices and the UxS is not sufficient to keep constant command of the craft. Also, while the system management portal is shown on the cloud, the system management portal can also be implemented on the human interface devices or the GCS or all of them without departing from the principles of the invention. In each the system management portal can be running and configured as a message broker only or a translator as needed. The functions of the system management portal can be distributed as well.

Figure 3:
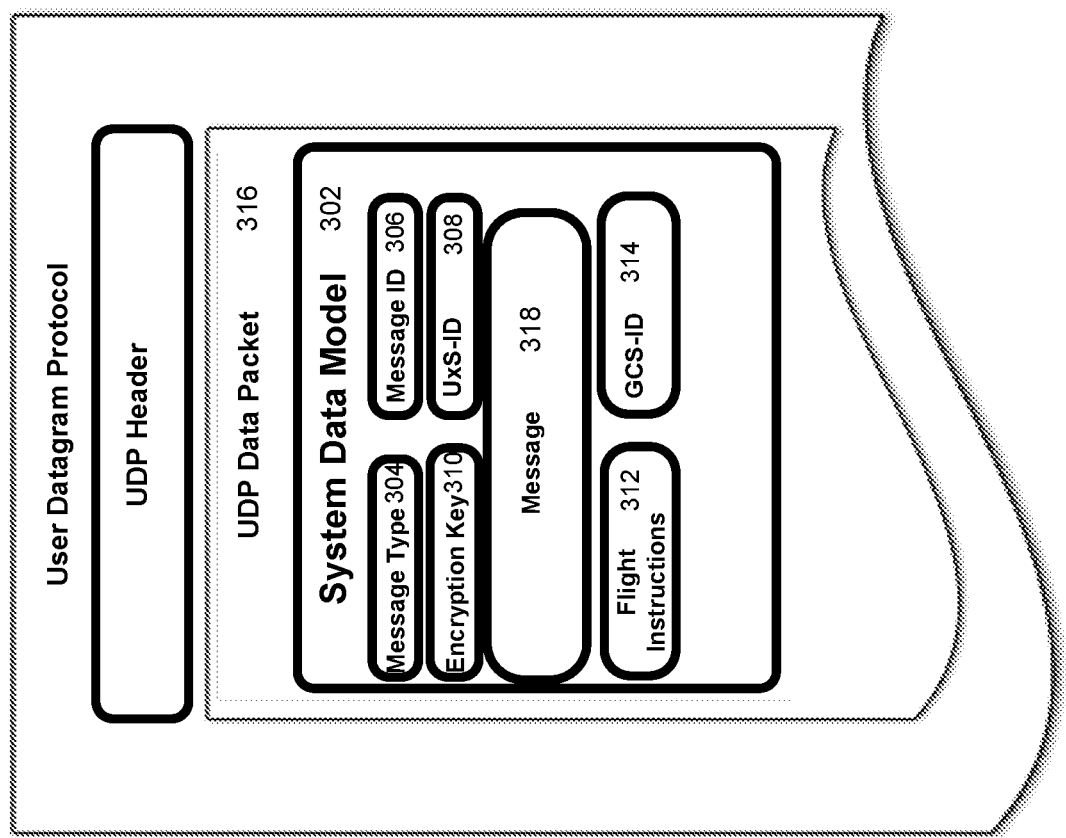
FIG. 3 shows an exemplary data input model according to the principles of the invention.

FIG. 3 shows an exemplary data model 300 (also referred to as the input data model or system data model) according to the principles of the invention. An exemplary system data model is a construct within software implementing a system according to the invention. This illustrative instance of a system data model is shown within the internet protocol User Datagram Protocol (UDP) where the data model 302 resides within the datagram element (data packet) 316 of the message. Contained within this protocol may be the message type 304, message ID 306, the UxS-ID 308, a counter (not shown), an "acknowledge receive" or "no acknowledge received" command (not shown), encryption key 310, the flight instructions 312, Ground Control Station ID 314, and other data elements indicative of a context that would be apparent to a person of ordinary skill in the art after having read this disclosure. The minimal set would include the flight instructions or operations instructions for the UxS and the message type.

The data mapping enables input data normalization. All input modes are normalized to command data and a context for the command data. The context includes providing the message type (e.g., voice, joystick, etc.) and other context data. This permits taking any command type and facilitating translation to the machine instructions that will permit the UxS to execute the command as if given in the context of the UxS's native input formats. In one aspect of the invention, the data mapping and normalization are carried out by the multi-modal interface middleware function which accepts input from the multiple control inputs, including voice, touch, joystick, or gesture. These inputs are normalized, such that the state of the system, as changed by one input, is observable by the other input types, as if only one input type was used for all operations.

In this aspect of the invention, the multi-modal interface middleware or multi-modal interface process includes the mapping of the multi-modal inputs to the input data model as previously discussed. As a result, any multi-modal or single mode of input into the device, in which inputs, regardless of source and type, can be received by the GCS effects middleware or process as will be explained below. The advantage of the architecture enables the translation and the message passing to happen anywhere along the communication chain to ensure a quality of service is maintained within the network.

The system data model may also be encrypted, and contain checksums. The message type describes if the message is a voice command, UxS machine encoded instruction, a tap from a wearable, or an acknowledge message from the UxS or some other type relevant to a multi-modal interface system according to the principles of the invention.

A person of ordinary skill in the art having read this disclosure will understand how to assign data elements according to a system data model to achieve multi-modal interfaces for UxS according to the principles of the invention. In the exemplary embodiment, the smartphone 204 embodies a multi-modal interface process that maps the control inputs to the data model and prepares the UDP packet for transmission. A person of ordinary skill in the art having read this disclosure will understand that this function can be performed remote from the user terminal, such as the smartphone preparing the UDP packet for the wearable. A person of ordinary skill in the art after reading this disclosure will understand that the system or input data model need not embody a UDP and that other data formats may be used to implement an input data model according to the principles of the invention. A person of ordinary skill in the art will understand the multi-modal interface process can be distributed among elements, such as a terminal 204 preparing the data for transmission and another element packetizing the transmission.

In the exemplary system 200, a portion of the multi-modal interface middleware or process can be said to reside within the system management portal in that the context data is processed to obtain the translated commands. Thus, in conjunction with the GCS effects middleware, the multi-modal input methods are translated into the commands that the drone will need to complete its tasks in a message type and format the drone will understand. As will be described, the translations can be done through a lookup table (stored in arrays in the software) wherein a command, such as a voice command "fly forward," is matched in a row or column with its machine language counterpart for the logic on the robotic device to interpret. The machine language translation of fly forward would translate to an encoded instruction to the UxS hardware which when decoded by the UxS would indicate for example "increase revolutions per minute by 20% for 45 seconds on front two rotors". To distinguish between the human interface input data and UxS input data, the input data model is used to describe a message format or type coming from a user's device like a gesture command from a wearable API (application programming interface). Conversely the GCS effects data model is the aforementioned data model which is readable by the drone system.

Figure 4:
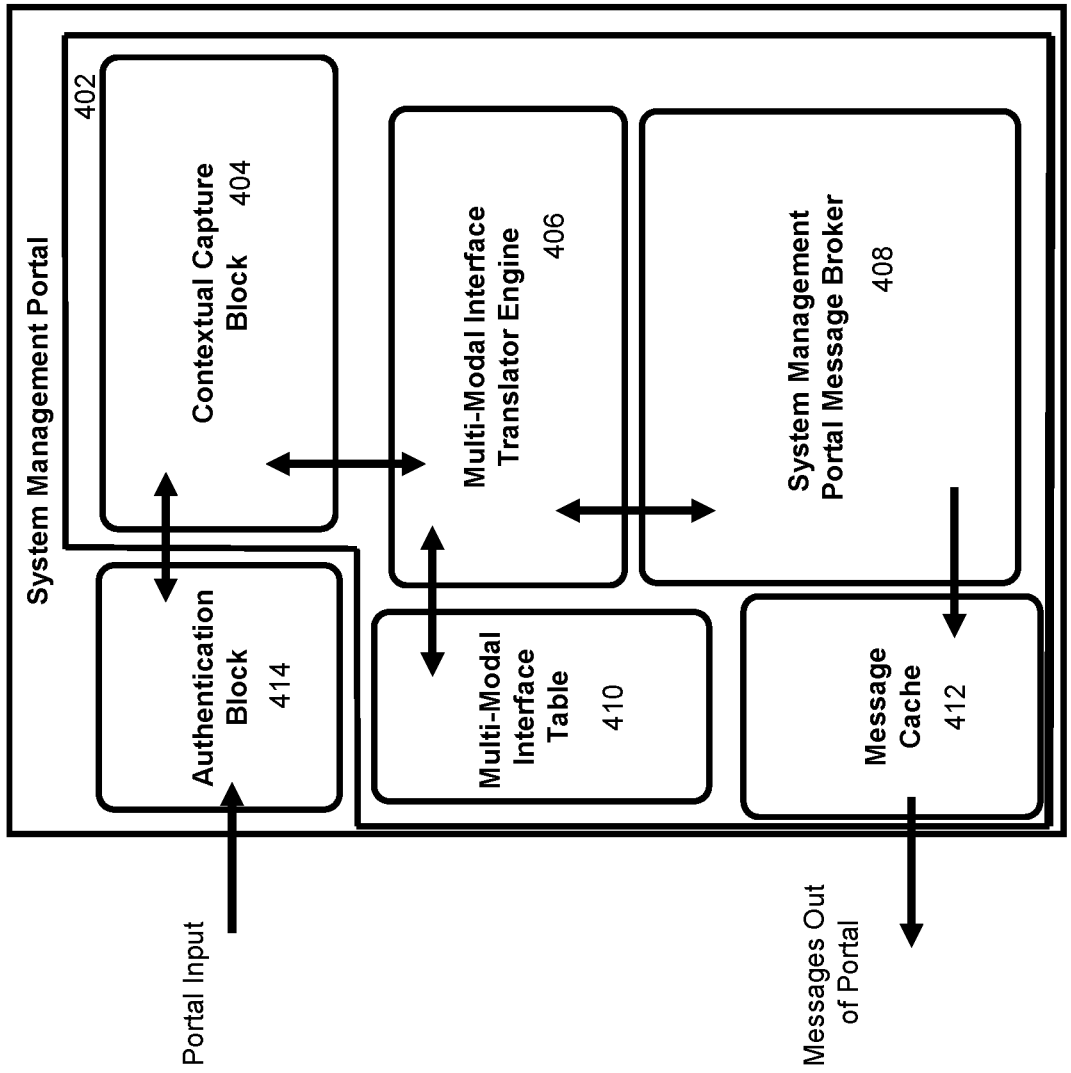
FIG. 4 shows a functional block diagram of an exemplary system management portal.

FIG. 4 shows a functional block diagram of an exemplary system management portal 400 of the type which can be used for exemplary system 200. The portal 400 includes GCS effects middleware 402 according to the principles of the invention. The GCS effects middleware 402 includes the contextual capture block 404, multi-modal interface translator 406, system management message broker 408, multi-modal interface table 410 and optionally the message cache 412. These elements perform an exemplary GCS effects process. The system management portal 400 receives messages from station on the network or locally if residing on a station, including messages formatted in the data input model. Optionally, an authentication block 414 authenticates the inputs.

If authenticated, the GCS effects middleware system 402 accepts sensor input data. The contextual capture block ingests the inputs according to the data model and extracts the UxS command message and the data indicative of a context of the message. The contextual capture block receives the normalized data according to the data input model. For the translation to occur, this block processes data of a type from any input device. If, for example, a data packet indicates the message type is from a wearable, then the context block processes the command data as if provided by the wearable. Once the context block understands the command message and the context, such as "fly forward" input by voice, it generates an out of context equivalent message. "Fly forward" as a voice input or tap on a display map may both be given as "move forward" for example. In one example, the out of context message is of the type that would be provided natively by an input device associated with the UxS such as an input device provided by the UxS manufacturer. The context block passes the out of context message to the translator engine 406.

The translator identifies and understands the out of context command or instruction and passes the command data to the interface table 410, requesting a look-up for the command. The table holds the data for commands executable by the UxS as previously explained. Look-up tables may be provided by UxS manufacturers for their machines. Thus, the translation can be changed to accommodate a particular UxS by changing the look-up table. An exemplary system management portal may include or have access to many look-up tables for interaction with many UxS. According to instructions from the translator engine, the table returns the translated UxS executable commands to the engine 412. The translation can be encoded.

The translator engine passes to the message broker 408 the executable command along with address and other data necessary for routing the message to the correct UxS. The message broker 408 acts as a router and a gateway to prioritize, schedule and route the command message to the appropriate station or drone using the appropriate protocols. The message broker can add appropriate headers, specify hops or carry out any functions necessary to move the message to the desired destination, such as another GCS or a UxS. A message cache 412 is provided to hold outgoing messages temporarily. Thus, the GCS effects middleware ingests messages according to the input data model and outputs messages according to the GCS effects data model understandable by the UxS.

Preferably, the GCS effects middleware 402 executes numerous communication protocol modules, which each communicate with one or more drones. The communication protocol may be at least one standard protocol required to communicate to a target drone, as specified in input or configuration settings. Once again referring to FIGS. 2 and 4, the robustness of the platform allows for the combined processing of a gesture on a wearable along with, for example, a latitude and longitude, inputted via the smart phone to cause a specified action to the UxS. The middleware contains routing and transformation capabilities to conform to the required data specification of the drone vendor or creator, then communicate actions to the drone. It is an advantage of this system according to the invention that a user can configure input modes as may be required to accomplish a project. In the example of a drone flight, the user may use a touch screen to lay in a gross flight plan, use a hand controller to accomplish tasks requiring fine motor skills at one location, use a push button to commence a pre-programmed sequence at another location, and use voice to input unexpected commands. Or, in multi-person teams, each of these acts may be carried out by a particular user operating in a corresponding input mode. In this respect, a system according to the invention expands the functionality of a drone limited to native inputs.

As previously stated, the system management portal 400 may contain an authentication block or process 414, which is a software which authenticates both users and messages. A user may authenticate through voice passwords, typed passwords, gestured passwords or any combination of the aforementioned. Message authentication is completed through the message type, message ID, the UAV-ID, and an encrypted key, similar to a Secured Socket Layer or Transport Layer Security as part of the internet protocol. Authentication tokens maybe passed as part of the message payload discussed above. Authentication may also occur using a service not necessarily residing within the portal 400.

While the exemplary system illustrates the system management portal residing on the cloud, the system management portal can run on any element in the exemplary network 200, including an edge device such as the smartphone or on multiple devices. The multi-modal interface process and the GC effects process may also run any element in network or the functionality may be distributed. It is an advantage that an edge device cannot reach the cloud, it can run the system management portal locally.

Figure 5:
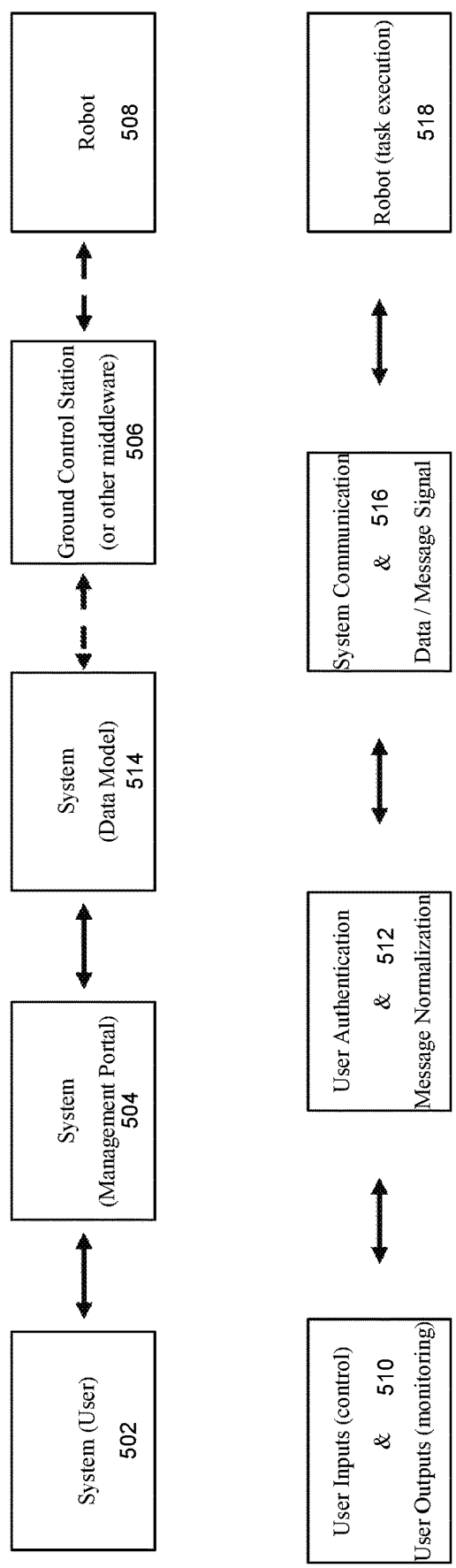
FIG. 5 shows an exemplary process according to the principles of the invention.

FIG. 5 shows an exemplary system level process 500 for controlling a drone according to the principles of the invention. The process 500 can be carried out on a system such as illustrative system 200. Consider an input for a specific command prompt for the UxS (regardless of the modality; voice-command, joystick movement, etc.) with the desired intent of having the drone increase elevation by 100 feet, while in flight. The associated output or signal for this specific command prompt (instruction) to the robot will be first routed through the integrated GCS for follow on signals communication with the robot (via the onboard computing platform and receiver), which then ultimately will be translated into the required technical or mechanical activities required to complete this action (e.g., the robot actually tilts "up" or the rotors start spinning faster to increase lift and thus elevation, etc.). The actual communications protocol may include radio or cellular communications, and the range of such communications can be hundreds of miles.

A person of ordinary skill in the art after having read this disclosure will understand that existing GCS 102 functionality can be modified according to the principles of the invention.

GCS or Common Control Systems often contribute to an adaptable framework that allow for seamless interoperability across autonomy behaviors and related systems for the drone manipulation. Furthermore, depending on the environment, use case, and specific robots or robot activity involved, a GCS can be a key factor in terms of the Federal Aviation Administration (FAA) and related certifications around the specific equipment and processes that would enable flight operations in the National Airspace System.

Referring to the process diagram 500, the process shows interaction among the system user 502, system management portal 504, system data model, GCS 506 and robot 508. The activities and functions are as follow. A user selects one or more input modes to facilitate desired functionality. The modes need not be native to the robot. The inputs processes and tasks such as command inputs over the selected input mode such as voice control, gesture control, joystick or touchscreen, as at 510. In the context of the example, the command may be a voice command to increase elevation 100 feet or the appropriate command entered via the other inputs. Likewise, the user has selected at 510 a feedback mode such as audio, haptic, visual or heads-up-display. The process 500 feeds back the command to the user at 510 in the selected mode. These selections therefore make a modal combination crafted by the user to meet the user's requirements.

The system management portal maps the input command to the input data model and normalizes the data as previously explained. The interface middleware or process carries out this function in the exemplary system. The system management portal authenticates the user and optionally the command as at 512. As previously explained, the input data model is ingested by the effects middleware, preferably in the management portal, and the commands are translated to a machine language understandable to the robot, as at 504 and 514. The translated command is provided to a GCS function for communication to the robot as at 506 and 516. The robot executes the task, in this case elevating 100 feet, and provides feedback data to the GCS, as at 508 and 518. The GCS can route data back to the user for output on the user's output device of choice.

The exemplary systems and methods reduce the amount of effort and work that an individual consumer or user needs to complete an interaction with the UxS, based on varying needs or requirements. Exemplary systems and methods as shown in can enable control and monitoring toward specific capabilities. Examples of specific UxS interaction capabilities and the corresponding uses around underlying intent include:

(1) Basic functions (e.g., input or outputs for basic drone functions such as turn on/off, take off/land, drone selection, change elevation, set waypoints for the drone to travel to, or to fly to waypoints that have been pre-established (pre-loaded) into the system, etc.)

(2) Flight plans (e.g., command inputs for a drone to orbit around a given location, or perhaps to utilize a drone's camera sensor to scan along a route to identify any obstacles, etc.)

(3) Sensor tasking (e.g., initiating various command inputs for a drone's camera to zoom in/out, or perhaps for a camera sensor to scan left/right; can also utilize cardinal directions, as an example using voice to "scan North" or "fly West" and the same command signal could be accomplished with a prescribed manipulation of a joystick or touch screen, etc.)

(4) Multi-robot activity (e.g., command inputs or monitoring outputs for multi-robot activity; select numerous drones within a larger group or "swarm" of drones using voice-commands or gesture-control movements; can incorporate multiple users of the system to enable multi-robot swarm functionality, concurrently, or to perform user control "hand-offs" of the various robots, etc.)

Operational environments can vary significantly in the context of UxS or drone use, and different settings or use cases may require different capabilities. Different interaction technology modalities have associated pros and cons. The related trade-offs will need to be evaluated and addressed on a case-by-case basis. Certain use cases may require having a hands-free capability (e.g., voice-control for the drone), as compared to other use cases, for which having a clear view of the drone's camera sensor (e.g., as shown on a visual display screen) might be the most important factor. So, although this type of analysis applies to HRI technologies (i.e., the touch screen may provide a high-quality visual display versus a voice or audio-driven feedback mechanism that lacks visual ingestion but is "hands-free"), a system according to the principles of the invention provides options and flexibility. Ultimately, users can choose the interface modality that best suits their needs or preferences in the context of UxS control and monitoring.

The exemplary system also provides heightened security around a multi-layered user authentication methodology. Such a system can accommodate for voice-authentication as opposed to facial recognition, or vice versa, or both based on user customization preferences. The system also enables further documentation, for example by storing voice-cut recordings, text recordings or video recordings for follow-on, post-operation analysis, learning and investigation, if warranted; it also affords opportunities for future data analytics that previously did not exist in the context of UxS and autonomy behaviors. The system may accommodate for additional interface modalities, such as eye-tracking versus some of the other control inputs described such as voice, touch and so forth so long as the modality is contextually translatable to the drone language. A person of ordinary skill in the art after reading this disclosure will understand that other additional modalities may be included as such modalities are developed.

The system according to the principles of the invention utilizes voice recognition, speech recognition and speech to text, gesture-control, other conventional control mechanisms (e.g. touch screen, joystick and stylus) in conjunction with complimentary overlapping technologies (e.g. GPS technology), to capture required information at origin, translate it into appropriate command prompts, which inherently become actionable for follow-on routing and execution of a UxS function or related data ingestion and feedback mechanisms. Preferably, before using the system, when creating an account each user must first provide certain inputs so that the system can establish and verify a unique signature for each individual user account, as it relates to each specific user authentication methodology (i.e. user would need to input a voice-cut, before a voice "signature" can be embedded in the system for that user account; user would need to link to a thumb print or facial recognition before those features can be operational within the system). These inputs are referred to as the authentication factor and as stated can include biometrics. Once this process is complete to a satisfactory level of specificity and confidence regarding distinction for each user account, users can then activate these protections within the system, as desired.

Advantageously, in addition to authentication to permit access to a system, the authentication can be extended to tasks, commands, modalities, file access or the like. A person of ordinary skill in the art will understand that different authentication requirements can be configured for different activities. It is an advantage of an inventive system that a user in configuring input modes can adapt authentication factor security as may be enabled by the chosen interface.

The platform may also use open source commoditized commercial artificial intelligence capabilities coupled with custom technologies to perform basic functions. Once the user has finished providing all necessary inputs or outputs for control and monitoring, they are able to visually or audibly confirm the accuracy of their intended command prompt by either visually confirming, or by requesting an audio "playback," such as a speech-to-speech confirmation of what the user had provided for inputs or outputs (should they so choose regarding these confirmations; they are not required, based on user preference). Once information has been confirmed by the user, data becomes ready to be transmitted through secure, encrypted connections for a more convenient, unobtrusive user experience while conducting UxS operations.

GPS technologies have been incorporated into an exemplary platform, as well as other capabilities that were included to accommodate for additional security and verification as well as benefits toward data analytics. All entries and operations are recorded with date and time stamp for post operation records, learning and analysis, as appropriate. The system may also be built to industry standards in terms of Federal Information Security Management Act compliance with appropriate security and encryption requirements accounted for, data protection (HIPAA compliance), etc. The system can also be structured for quick and efficient interoperability with existing enterprise command and control dataflows and architectures, with cloud-integrated systems (including Amazon web services). Data models and APIs are available for easy customer integration to enable both dynamic team and device setup, and live data retrieval and ingestion, to include on-premises deployments.

What is claimed is:

1. A multi-modal system for controlling an unmanned vehicle comprising:
    a human-to-machine interface including a plurality of selectable input modes, including:
        (i) at least one of a voice input, a hand-held controller, and a touch screen input, and
        (ii) at least one selectable human feedback device;
    an interface process responsive to data indicative of instructions to the unmanned vehicle input on selected ones of the input modes and operable to map the inputs to a data model that includes data indicating the instructions, the unmanned vehicle, and the selected input mode corresponding to the input data indicative of the instructions; and
    a ground control effects process operable to process the data model including a process to extract from the data model input context data including the data indicative of the instructions to the unmanned vehicle and data indicative of the selected input mode corresponding to the input data indicative of the instructions and to translate the instructions to control command data executable by the unmanned vehicle;
    wherein the unmanned vehicle is operable to respond to instructions provided in a pre-determined machine language translated from data indicative of the instructions provided via an input mode native to the unmanned vehicle, and
    wherein the selectable input modes include the input mode native to the unmanned vehicle and at least one non-native input mode, the ground control effects process operable to normalize the extracted input context data to out of context command data and to translate the out of context command data to the pre-determined machine language.

2. The system of claim 1 wherein the plurality of selectable input modes further includes a gesture input mode.

3. The system of claim 1 wherein the plurality of selectable input modes further includes a tactile input mode.

4. The system of claim 1 wherein the at least one selectable human feedback device includes a plurality of human feedback devices.

5. The system of claim 4 wherein the plurality of human feedback device includes at least one of visual display, audio feedback, haptic feedback, heads up display, geolocation overlay, and wearable sensor.

6. The system of claim 4 further comprising a process for configuring the human-to-machine interface to include a selected combination of input modes and feedback devices.

7. The system of claim 1 further comprising an authentication module responsive to inputs on the human-to-machine interface and configurable to authenticate instructions according to an authentication factor provided on the selected input mode, wherein the authentication module rejects instructions input via an unselected input mode.

8. The system of claim 7 wherein the input mode includes a voice recognition input mode and the authentication factor includes a user's voice.

9. The system of claim 1 further comprising a plurality of nodes wherein the the ground control effects process executes on ones of the plurality of nodes.

10. The system of claim 1 wherein the ground control effects process executes on a ground control station comprising a processor, a transmitter, and a receiver, the receiver operable to receive transmissions including the data model and the transmitter operable to transmit translated command data to the unmanned vehicle.

11. The system of claim 10 wherein the system further comprises a transmitter and a receiver responsive to the human-to-machine interface, and wherein the ground control station transmitter sends signals to the unmanned vehicle and the ground control station receiver receives signals originating from the unmanned vehicle and receives other signals originating from the transmitter responsive to the human-to-machine interface.

12. The system of claim 1 further comprising a task manager process responsive to the human inputs and operable to instantiate tasks for the unmanned vehicle.

13. The system of claim 1 further comprising a configuration process responsive to human inputs and operable to configure one of the selectable input modes to control selected actions of the unmanned vehicle and another of the selectable input modes to control other selected actions of the unmanned vehicle.

14. A multi-modal system for controlling an unmanned vehicle comprising:
   a human-to-machine interface including a plurality of selectable input modes, including:
      (i) at least one of a voice input, a hand-held controller, and a touch screen input, and
      (ii) at least one selectable human feedback device;
   an interface process responsive to data indicative of instructions to the unmanned vehicle input on selected ones of the input modes and operable to map the inputs to a data model that includes data indicating the instructions, the unmanned vehicle, and the selected input mode corresponding to the input data indicative of the instructions; and
   a ground control effects process operable to process the data model including a process to extract from the data model input context data including the data indicative of the instructions to the unmanned vehicle and data indicative of the selected input mode corresponding to the input data indicative of the instructions and to translate the instructions to control command data executable by the unmanned vehicle; wherein the process to translate further includes a process to determine acontextual data indicative of the instructions and to determine from the acontextual data the control command data executable by the unmanned vehicle.

15. A networked system for controlling an unmanned vehicle comprising nodes in networked communication, the nodes including:
   at least a first user node having a first human-to-machine interface including a plurality of selectable input modes, including at least one of a native input mode and at least one of a non-native input mode, and at least one selectable human feedback device, the first user node further including an interface process responsive to data indicative of instructions to the unmanned vehicle input on the selected ones of the input modes and operable to map the inputs to a data model that includes data indicating the instructions, the unmanned vehicle and the selected input mode;
   at least a second user node having a human-to-machine interface including at least one input mode and at least one feedback device, the second user node further including a second user node interface process responsive to data indicative of instructions to the unmanned vehicle input on the at least one input mode according to the data model;
   a system management node including a process operable to extract contextual data from the data model, the contextual data including the data indicative of instructions and the at least one input mode, to determine from the contextual data acontextual command data and to translate the acontextual command data to control data executable by the unmanned vehicle, the system management portal node further including a message router operable to route the control data to the unmanned vehicle,
   wherein the unmanned vehicle executes the instructions input at the first and second user node according to the data model.

16. The network of claim 15 wherein the nodes include processes for executing instructions and storing data according to the data model.

17. The network of claim 15 wherein the nodes further include processes for updating state according to the data model.

18. A method for controlling an unmanned vehicle having an associated native input modality, the method comprising:
   selecting, via a multi-modal human interface, at least one non-native input modality from a plurality of human input modalities;
   in response to an input at the multi-modal human interface, establishing networked communication between the multi-modal human interface and the unmanned vehicle;
   receiving control commands for the unmanned vehicle at the multi-modal human interface via the at least one non-native input modality;
   mapping the received control commands to data indicative of the received control commands according to a data input model;
   from the data input model, translating the data indicative of the received commands to data indicative of commands executable by the unmanned vehicle, including the steps of:
      extracting from the data model context data indicating the received control commands and the non-native input modality,
      determining acontextual command data from the extracted context data, and translating the acontextual command data to corresponding data indicative of commands executable by the unmanned vehicle; and transmitting the data indicative of commands executable by the unmanned vehicle on a channel accessible to the unmanned vehicle.

19. The method of claim 18 further comprising in response to an input at the multi-modal human interface, executing a user authentication process for the received commands, wherein at least the transmitting step depends on a successful output for the authentication process.

20. The method of claim 18 the plurality of human input modalities includes voice input and gesture input.

21. The method of claim 18 comprising the further steps of selecting a feedback modality from a plurality of feedback modalities, receiving sensor output from the unmanned vehicle, and outputting the sensor output according to the selected feedback modality.

22. The method of claim 18 including the further steps of generating a task for the unmanned vehicle, wherein the task comprises a plurality of executable commands and associated data for the executable commands and wherein the data indicative of commands executable by the unmanned vehicle includes the data indicative of the task.

* * * * *